(12) United States Patent
Kanamaru

(10) Patent No.: US 6,729,308 B1
(45) Date of Patent: May 4, 2004

(54) FUEL FEED DEVICE

(75) Inventor: Shigeki Kanamaru, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 108 days.

(21) Appl. No.: 10/110,694

(22) PCT Filed: Aug. 18, 2000

(86) PCT No.: PCT/JP00/05527

§ 371 (c)(1),
(2), (4) Date: Apr. 17, 2002

(87) PCT Pub. No.: WO02/16752

PCT Pub. Date: Feb. 28, 2002

(51) Int. Cl.$^7$ ............................................... F02M 37/04
(52) U.S. Cl. ...................................... 123/510; 123/509
(58) Field of Search .................................. 123/509, 510, 123/514, 495, 516

(56) References Cited

U.S. PATENT DOCUMENTS

| | | | |
|---|---|---|---|
| 5,343,902 A | * 9/1994 | Ramioulle | 141/7 |
| 5,623,907 A | * 4/1997 | Cotton et al. | 123/456 |
| 5,769,061 A | * 6/1998 | Nagata et al. | 123/509 |
| 6,106,244 A | * 8/2000 | Nakatsukasa et al. | 417/313 |
| 6,123,521 A | * 9/2000 | Mori et al. | 417/423.3 |
| 6,142,126 A | * 11/2000 | Kanamaru | 123/509 |
| 6,382,190 B1 | * 5/2002 | Tanabe et al. | 123/509 |
| 2002/0136856 A1 | * 9/2002 | Sugimura et al. | 123/509 |

FOREIGN PATENT DOCUMENTS

WO    WO 96/23967    8/1996

* cited by examiner

Primary Examiner—Carl S. Miller
(74) Attorney, Agent, or Firm—Sughrue Mion, PLLC

(57) ABSTRACT

In a system in which a housing including a fuel passage is formed by heat welding joining end faces of an upper housing and a lower housing made of a synthetic resin, the melted end portion in the welded portion is pushed out and comes to form a flash. The flash varies in size and shape depending upon the state of melting of the joining end faces and the amount of the portion moved due to the pressing, and the finished housing varies in length. The flash protruding at a portion serving as a fuel passage makes the passage area narrow and increases resistance of the passage, and a weak portion in the flash sometimes drops due to fatigue fracture caused by pulsation of fuel flow.

Contact ribs 3b, 13b facing each other at a portion lower than the joining end faces 3a, 13a are provided with space grooves 3c, 13c interposed along the joining end faces 3a, 13a of the upper housing 3 and the lower housing 13, and the joining end faces are melted and pressed so that the contact ribs 3b, 13b of the upper housing 3 and the lower housing 13 may come in contact with each other, thus length of the housing 11 being determined by the contact ribs 3b, 13b. The flash 21 is caused to stay in a staying space 22 closed by the contact ribs 3b, 13b at the time of completing the heat welding.

12 Claims, 4 Drawing Sheets

FUEL FEED DEVICE

FIELD OF THE INVENTION

The present invention relates to a fuel supply system for raising a pressure of a fuel and supplying the fuel from a fuel tank to an internal-combustion engine or the like and, more particularly, to a fuel supply system that is prevented from influence of flash produced at the time of forming a housing including fuel passages by welding resin materials.

BACKGROUND ART

FIGS. 4 and 5 show a conventional fuel supply system disclosed in the International Publication No. WO96/23967. FIG. 4 is a sectional side view, and FIG. 5 is a plan view. FIG. 6 is an explanatory view of hot plate welding for forming a housing, and FIG. 7 is a sectional view taken along the line X-Y-Z.

In the drawings, numeral 1 is a fuel tank, and numeral 2 is an opening of the fuel tank 1. A lid 3 made of a synthetic resin is formed so as to cover the opening 2, and a sealing gasket 4 is interposed between the lid 3 and the fuel tank 1.

A fuel pump 5, a fuel filter 6, a pressure regulator 7, a fuel level gauge 8, an electric connector 9, and a discharge pipe 10 respectively serving as functional parts of a fuel supply system are integrally built in the lid 3 forming a unit.

The fuel filter 6 is constructed such that a filtration element 12 is accommodated in a housing 11. Moreover, the lid 3 is a part of the housing 11, and the fuel filter 6 is suspended from the lid 3. The housing 11 is comprised of the lid 3 serving as an upper housing and a lower housing 13, and the lower housing 13 is molded of a synthetic resin material. the lid 3 and the lower housing 13 are welded fluid-tight at a boundary portion 14 over the whole circumference, and the filtration element 12 is disposed in the internal space.

An intake pipe 15 serving as a fuel intake port is formed at an upper part on the inner circumferential side of the housing 11 of the fuel filter 6 and is connected to a discharge pipe of the fuel pump 5.

A pipe 16 (indicated by the one-dot chain line in FIG. 4) forming a first fuel discharge port, among two fuel discharge ports of the housing 11, communicates to the discharge pipe 10 provided on the lid 3 and extends upward from a lower end of the lower housing 13.

A return pipe 18 serving as a second fuel discharge port is formed at a lower portion of the lower housing 13 and is connected to the pressure regulator 7.

The electric connector 8 integrally formed with the lid 3 is connected to a power source and a controller (not shown) outside of the fuel tank 1. In the fuel tank 1, the electric connector 8 is connected to the fuel pump 5 through a lead wire not shown, and supplies an electric power to a motor of the fuel pump 5. Further, the electric connector 8 is connected to the fuel level gauge 8 (shown in FIG. 8) through a lead wire not shown and transmits an electric signal indicating a level of the fuel.

The lower housing 13 is made of a conductive synthetic resin and discharges static electricity generated when the fuel passes through the filtration element 12 through the electric connector 8.

In the fuel supply system of above construction, when an electric power is supplied to the fuel pump 5 through the electric connector 8, the fuel pump 5 sucks the fuel through a filter 19, raises a pressure of the fuel, and delivers the fuel to the intake pipe 15 located at the upper part on the inner circumferential side of the housing 11.

The fuel flows through a passage 20 between the lower housing 13 and the lid 3 in the direction indicated by the arrow A. In the fuel filter 6, the fuel flows downwards in the housing 11, whereby dust or the like in the fuel is filtered during the passage of the fuel through the filtration element 12.

The fuel having passed through the filtration element 12, further passing through the discharge pipe 10, is supplied from the pipe 16 to an injector (not shown) of an engine fuel injection system. In this process, the pressure regulator 7 regulates the pressure of the fuel supplied to the injector so that the pressure may be constant, and a surplus fuel generated due to the change in consumption amount is returned from the pressure regulator 7 to the fuel tank 1.

In the mentioned construction, the lid 3 and the lower housing 13 are welded fluid-tight at the boundary portion 14 over the whole circumference, and hot plate welding is generally employed for the welding. In the hot plate welding, as shown in FIG. 6, end faces of the lower housing 13 and the lid 3 to be welded are heated to a melting temperature with a heating plate 30 as a heating source. Then the heating plate 30 is removed, and the joining end faces of the lower housing 13 and the lid 3 are pressed to each other and heat-welded.

In the cross section of the welded portion formed by the hot plate welding, as shown in FIG. 7, an end portion of the molten portion is pushed out due to the pressing and forms a flash 21. The flash 21 varies in size and shape depending upon the state of melting of the joining end faces and the amount of the portion moved due to the pressing. As a result, the housing 11 varies in length. The flash 21 protruding at a portion serving as a fuel passage makes the passage area narrow and increases resistance of the passage. At the same time, pulsation in the fuel flow applies a deformation stress to the flash 21, and a weak portion in the flash 21 sometimes drops due to fatigue fracture. If the flash 21 in a welded portion located upstream from the filtration element 12 of the fuel filter drops, the flash 21 is caught by the filtration element 12. However, if the flash 21 at the welded portion downstream the filtration element 12 comes to drop, there arise such problems as shortage in fuel supply due to clogging of a downstream pipe or engine trouble due to clogging of a nozzle portion of the injector disposed downstream.

The present invention was made to solve the above-discussed problems and has an object of providing a fuel supply system in which the housing is restrained from variation in longitudinal dimensions due to hot plate welding, the flash does not protrude into the passage, and even if any flash of the welded portion drops, the dropped flash does not flow into the passage.

DISCLOSURE OF INVENTION

In the fuel supply system according to the invention, for forming a passage for liquid fuel supplied from a fuel pump in a housing, the housing is formed fluid-tight by heat welding joining end faces of an upper housing and a lower housing both made of a synthetic resin, the upper housing and the lower housing are respectively provided with contact ribs facing each other at a tier lower down from the joining end faces, and the joining end faces are subject to melting, pressing and heat welding so that the contact ribs of the upper housing and the lower housing may come in contact with each other.

The contact ribs are provided with space grooves interposed along the joining end faces, the space grooves being formed into a closed staying space at the time of completing the heat welding, and flash getting out at the time of heat welding is caused to stay in the staying space.

The staying space formed by the contact ribs is provided at least in a passage downstream a filtration element.

BEST MODE FOR CARRYING OUT THE INVENTION

Embodiment 1

Figure 1:
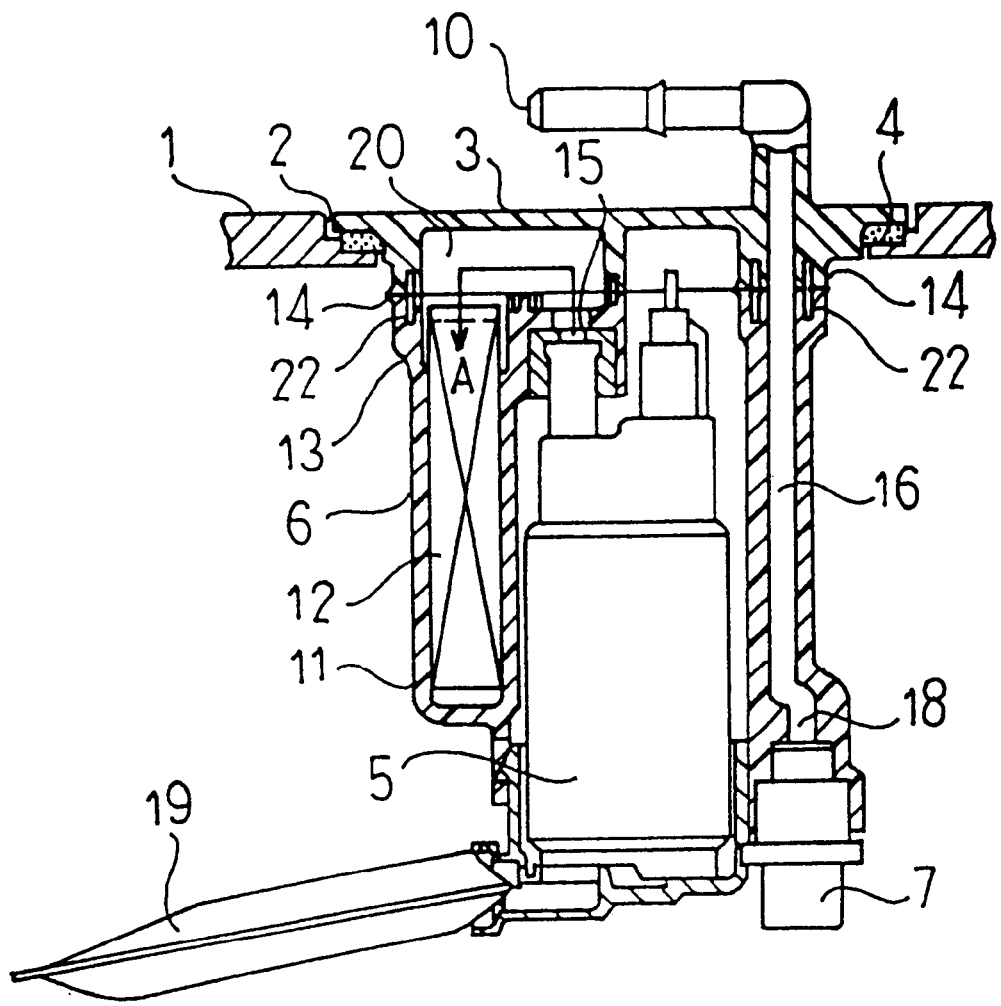
FIG. 1 is a sectional side view of a fuel supply system showing Embodiment 1 of the invention.
Figure 2:
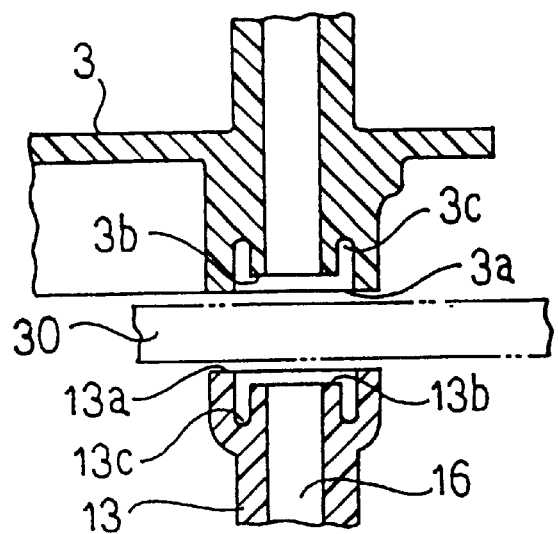
FIG. 2 is an explanatory view of hot plate welding for forming a housing according to the invention.
Figure 3:
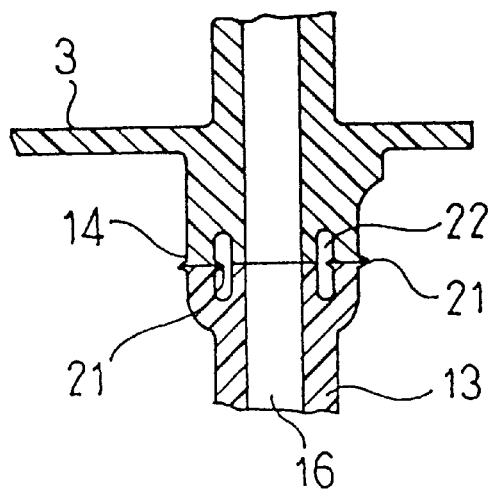
FIG. 3 is an enlarged partially sectional view of a welded portion according to the invention.
Figure 4:
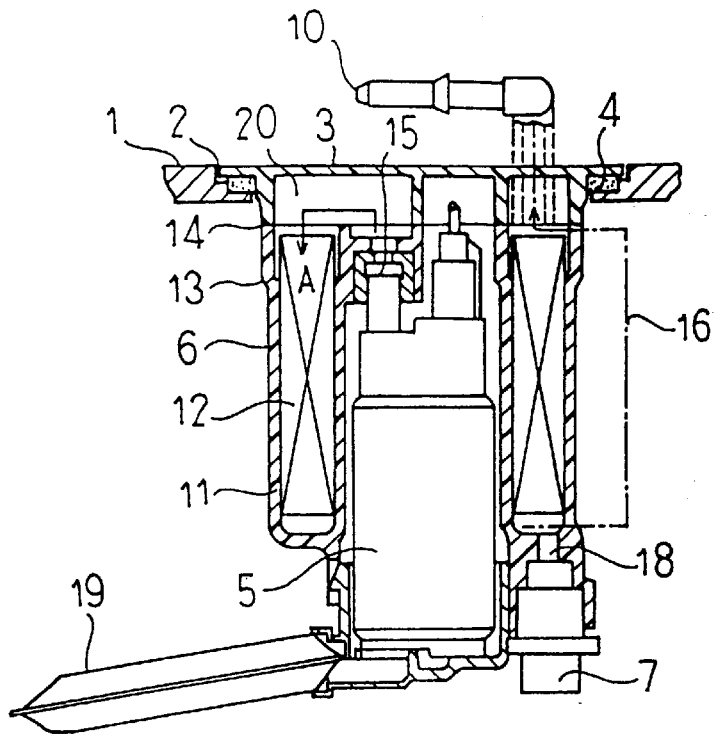
FIG. 4 is a sectional side view of a conventional fuel supply system.
Figure 5:
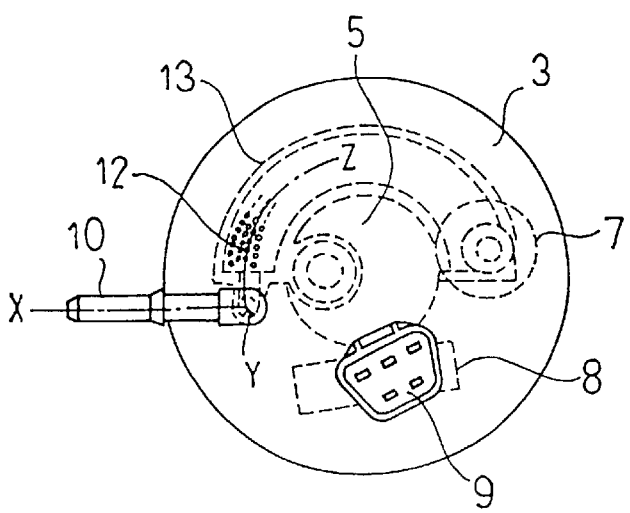
FIG. 5 is a plan view of the conventional fuel supply system.
Figure 6:
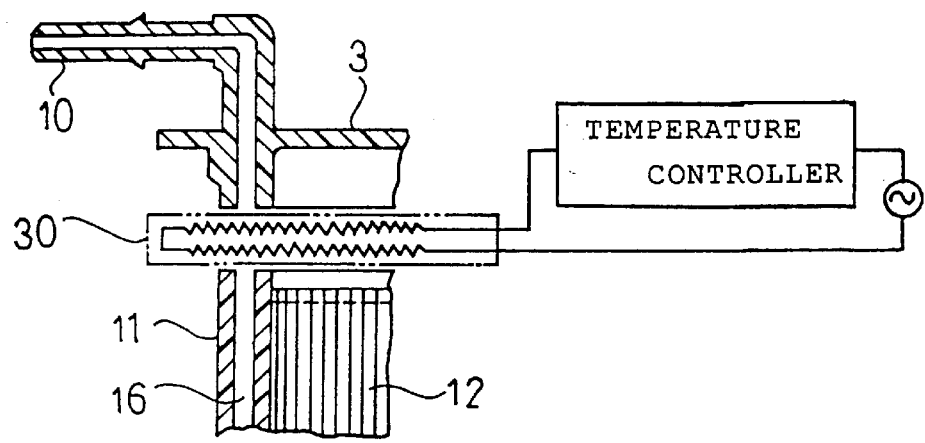
FIG. 6 is an explanatory view of hot plate welding for forming a housing.
Figure 7:
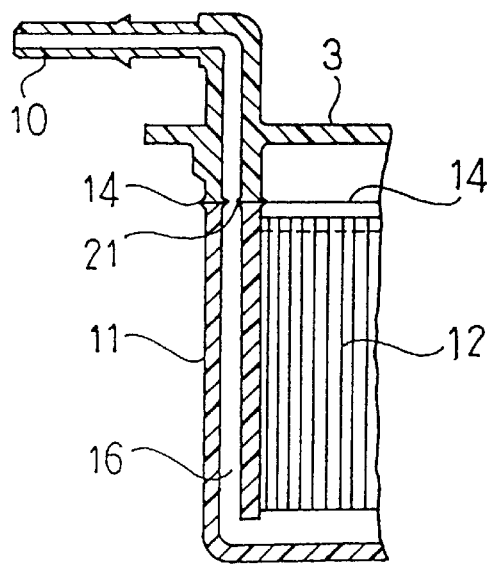
FIG. 7 is a sectional view taken along the line X-Y-Z in FIG. 5.

FIG. 1 is a sectional side view of a fuel supply system showing Embodiment 1 of the invention, FIG. 2 is an explanatory view of hot plate welding for forming a housing according to the invention, and FIG. 3 is an enlarged partially sectional view of a welded portion. In the drawings, numerals 1 to 21 and 30 indicate the same parts as those in the foregoing description of the conventional system.

The lid 3 and the lower housing 13 are made of a synthetic resin material. Numeral 3a is a joining end face of the lid 3 forming an upper portion of the housing 11, numeral 3b is a contact rib provided along the joining end face 3a at a portion a little lower than the joining end face 3a, and numeral 3c is a space groove provided between the joining end face 3a and the contact rib 3b. Numeral 13a is a joining end face of the lower housing 13, and this joining end face 13a of the lower housing 13 and the joining end face 3a of the lid 3 are welded and formed into the boundary portion 14. End faces of a partition wall of the housing 11 perpendicular to the boundary portion 14 are the joining end faces 3a, 13a, and an outer shell of the housing 11 and a passage are formed fluid-tight by welding and joining the lid 3 and the lower housing 13 at the joining end faces 3a, 13a.

Numeral 13b is a contact rib provided along the joining end face 13a at a portion a little lower than the joining end face 13a, and numeral 13c is a space groove provided between the joining end face 13a and the contact rib 13b. The joining end faces 3a, 13a and the contact ribs 3b, 13b of the lid 3 and the lower housing 13 are facing each other respectively.

In the hot plate welding of the lid 3 and the lower housing 13, as shown in FIG. 2, the heating plate 30 serving as the heating source is interposed between the joining end face 3a of the lid 3 and the joining end face 13a of the lower housing 13, and both of the joining end faces are heated to a melting temperature. Then the heating plate 30 is removed, and the joining end faces are pressed and welded fluid-tight together. In this process, since the contact ribs 3b, 13b of the lid 3 and the lower housing 13 are at a portion a little lower than the joining end faces 3a, 13a and are not heated up to a melting and softening temperature, the contact ribs 3b, 13b are not deformed by the pressing.

Accordingly, deformation of the boundary portion 14 stops at a portion where the contact ribs 3b, 13b come in contact with each other, and the finished housing 11 has a constant length.

Further, as shown in FIG. 3, when the lid 3 and the lower housing 13 are welded, a staying space 22 is formed by the space grooves 3c, 13c of the lid 3 and the lower housing 13. In this process, the flash 21, that is formed by pressing and deforming the joining end faces of the lid 3 and the lower housing 13, can be caused to remain in the staying space 22. As a result, forming the staying space 22 on the side where the fuel flows makes it possible to prevent the passage area from narrowing due to protruding of the flash 21 and restrain the flash 21 from dropping due to pulsation of the flowing liquid fuel. Even if the flash 21 drops, it is possible to prevent the downstream pipe from clogging by causing the flash 21 to remain in the staying space 22 so as not to flow downstream.

It may be the most preferable to provide the space grooves 3c, 13c and the contact ribs 3b, 13b on the circumference of the joining end faces. In this case, however, the sectional area of the fuel supply system becomes large, which is not desirable from the viewpoint of down sizing of the system. Therefore, it is also preferable that a portion not seriously affected by the flash 21 is dotted with the contact ribs 3b, 13b within a limited range in which the dimensions after the heat welding are constant. It is also preferable that the staying space 22 is formed only at a portion where dropping of the flash 21 influences the fuel system and the other parts remains in the same welding structure as in the prior art. The liquid fuel is supplied by driving the fuel pump 5 in the same manner as in the conventional system, and therefore further description thereof is omitted herein.

Industrial Applicability

As has been described above, in the present invention, the contact ribs 3b, 13b are provided with the space grooves 3c, 13c interposed along the joining end face 3a of the lid 3 and the joining end face 13a of the lower housing 13 at a portion lower than the joining end faces 3a, 13a. As a result, when both of the joining end faces are heated, pressed and welded to each other, deformation of the joining end faces is stopped at the position where the contact ribs 3b, 13b come in contact with each other, and dimensions of the finished housing 11 becomes constant.

The space 22 formed on the passage side at the time of completing the welding causes to stay therein the flash 21 produced by the pressing and deformation process, thereby preventing the passage area from being narrowed, restraining the flash 21 from dropping due to the pulsation of the flowing liquid fuel, the flash 21 once dropped stays in the space 22, and the downstream pipe is prevented from clogging.

What is claimed is:

1. A fuel supply system comprising:
    a housing containing a fuel pump and a passage for liquid fuel supplied from the fuel pump, wherein:
        said housing is formed fluid-tight by joined end faces of an upper housing and a lower housing, both made of a synthetic resin;
        said upper housing and said lower housing are respectively provided with contact ribs facing each other at positions laterally adjacent to the joining end faces; and said joined end faces have been heat welded together, and both contact ribs are in contact with each other.

2. The fuel supply system according to claim 1, wherein space grooves are interposed between the contact ribs and the joined end faces, the space grooves being formed into a staying space closed with said ribs at the time of completing the heat welding, so that any flash from the heat welding remains in the staying space.

3. The fuel supply system according to claim 2, wherein the staying space formed by the contact ribs is provided at least in a passage downstream of a filtration element.

4. The fuel supply system according to claim 1, wherein the joined end faces and the contact ribs are laterally separated by a space groove.

5. The fuel supply system according to claim 1, wherein the joined end faces and the contact ribs are both arranged on an outer wall of the housing.

6. The fuel supply system according to claim 5, wherein the joined end faces and the contact ribs are laterally separated by a space groove.

7. The fuel supply system according to claim 5, wherein the joined end faces are joined on an outer side of the outer wall, and the contact ribs are in contact on an inner side of the outer wall.

8. The fuel supply system according to claim 1, wherein the joined end faces and the contact ribs are both arranged on a wall of the passage for liquid fuel supplied from the fuel pump.

9. The fuel supply system according to claim 8, wherein the joined end faces and the contact ribs are laterally separated by a space groove.

10. The fuel supply system according to claim 8, wherein the joined end faces are joined on an outer side of the wall of the passage, and the contact ribs are in contact on an inner side of the wall of the passage.

11. A fuel supply system in which a passage for a liquid fuel supplied from a fuel pump is formed in a housing, said passage being sunk into a fuel tank integrally with a fuel pump and the housing, wherein:

said housing is formed fluid-tight by heat welding joining end faces of an upper housing and a lower housing both made of a synthetic resin;

said upper housing and lower housing are respectively provided with contact ribs facing each other at a portion lower than the joining end faces; and said joining end faces are subject to melting, pressing and heat welding so that both contact ribs may come in contact with each other; and said contact ribs are provided with space grooves interposed along the joining end faces, the space grooves being formed into a space closed with said ribs at the time of completing the heat welding, and a flash formed at the time of heat welding is caused to stay in said space.

12. The fuel supply system according to claim 11, wherein the space formed by the contact ribs is provided at least in a passage downstream of a filtration element.

* * * * *